United States Patent [19]

Bilow

[11] 3,859,353
[45] Jan. 7, 1975

[54] PROCESS FOR PRODUCING TEREPHTHALOHYDROXIMOYL CHLORIDE

[75] Inventor: Norman Bilow, Los Angeles, Calif.

[73] Assignee: Hughes Aircraft Company, Culver City, Calif.

[22] Filed: Nov. 8, 1973

[21] Appl. No.: 414,049

[52] U.S. Cl. ............................................ 260/566 A
[51] Int. Cl. ........................................ C07c 131/00
[58] Field of Search .................... 260/566 D, 566 A

[56] References Cited
OTHER PUBLICATIONS

D'Alelio, "Fundamental Studies on Reactive Oligomers," Air Force Materials Laboratory Technical Report, AFML–TR–70–39, (1971) pg. 3, Section II.

Primary Examiner—Leon Zitver
Assistant Examiner—Gerald A. Schwartz
Attorney, Agent, or Firm—W. H. MacAllister, Jr.; B. T. Hogan, Jr.

[57] ABSTRACT

Terephthalohydroximoyl chloride is produced by chlorinating terephthalaldehyde dioxime in the presence of a nitro compound solvent.

8 Claims, No Drawings

PROCESS FOR PRODUCING TEREPHTHALOHYDROXIMOYL CHLORIDE

The invention herein described was made in the course of or under a contract with the United States Air Force.

BACKGROUND OF THE INVENTION

1. Field of the Invention

This invention deals with the synthesis of a known compound by a new method that produces a product of increased purity at high yields.

2. Description of the Prior Art

Terephthalohydroximoyl chloride is an essential intermediate used to prepare terephthalonitrile-N,N'-dioxide, a compound which has been shown to be an excellent curing agent for vinyl-, ethynyl-, and cyano-substituted polymers. Its demand is great and is growing with the expanding field of high temperature adhesives and laminating resins.

The synthesis of terephthalohydroximoyl chloride is described in published literature*. It has been made by the chlorination of terephthalaldehyde dioxime with chlorine using $CCl_4$, chloroform, or acetic acid as the solvent and with nitrosyl chloride (NOCl) using ether as the solvent. The former method generally yields only about 10–15 percent product whereas the latter method (NOCl in ether) results in both a low yield and a relatively impure product.

*Air Force Materials Laboratory Technical Report AFML-TR-70-39 Fundamental Studies on Reactive Oligomers by G. F. D'Alelio dated March 1970.

SUMMARY OF THE INVENTION

I have discovered that if in the synthesis of terephthalohydroximoyl chloride by chlorination with chlorine, the $CCl_4$ solvent is replaced by a nitro compound, the yield can be increased from about 15 percent to as much as 70 percent with a simultaneous reduction of reaction time and labor to about 20% of what it required when we followed the published reports. In addition, the resulting product is purer than that obtained by any other method.

This invention will facilitate a more abundant and thus more economical supply of the essential intermediate for the preparation of terephthalonitrile -N,N'-dioxide which has unlimited applications in the formulation of high temperature polymers that cure through an addition process.

The ability to produce high temperature addition cured polymers is essential in the preparation of void free composite structures which can withstand high temperatures. Polymeric materials cured by compounds formulated from this intermediate compound by an addition cure process will withstand temperatures of over 250°C. whereas common addition polymers such as the epoxy resins and polyurethanes generally cannot be used at temperatures in excess of 150°C.

DESCRIPTION OF THE INVENTION

Current techniques for the synthesis of terephthalohydroximoyl chloride involve the chlorination of terephthalaldehyde dioxime with chlorine in the presence of chloroform, acetic acid or carbon tetrachloride. I have discovered that by a careful choice of organic nitro compounds as reaction solvents, the yield and product purity can be increased with a simultaneous reduction of reaction time and labor.

My process may be illustrated as follows:

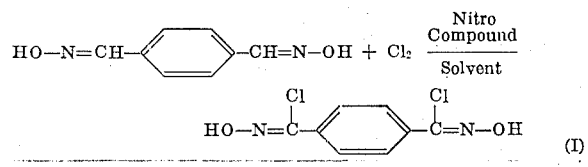

(I)

More specifically, I have discovered that nitro benzene, nitromethane, nitroethane, nitropropane, nitrobutane, nitropentane and chloronitrobenzene function as excellent reaction solvents for the chlorination of terephthalaldehyde dioxime by chlorine. Other nitro-compounds could also be used but there would be no advantage in using those which boil above 211°C because of the need to remove the solvent after the chlorination is completed.

EXAMPLE I

Into a 2 liter 3 neck flask, fitted with a stirrer, gas inlet, gas outlet tube and thermometer, containing terephthalaldehyde dioxime (100g.,0.16 mole) and fresh nitrobenzene (950 ml.), bubble in chlorine gas for about 20 minutes. The temperature will rise to approximately 48°C. Discontinue the gas addition and allow the reaction to cool to 32°C and then pass additional chlorine through the flask for about 1 hour. Collect the product obtained by filtration and wash with carbon tetrachloride. Dry the product in a vacuum oven at 40°C and then recrystallize it from benzene. Approximately 61 grams of product having a melting point of 187°–189°C, which represents a yield of 43 percent of pure product, will be obtained. Additional product may be recovered by reprocessing the mother liquid (concentrating it by vacuum distillation) to collect a second crop of terephthalohydroximoyl chloride as disclosed above.

What is claimed is:

1. A method of synthesizing terephthalohydroximoyl chloride by chlorination with chlorine comprising the steps of:
    a. forming a solution of terephthalaldehyde dioxime and an organic nitro compound solvent selected from the group consisting of nitrobenzene, nitromethane, nitroethane, nitropropane, nitrobutane, nitropentane, chloronitrobenzene, nitroxylene and nitrotoluene;
    b. chlorinating said compound in solution by passing chlorine gas through said solution while maintaining a temperature of less than 48°C; and
    c. recovering said terephthalohydroximoyl chloride.

2. The method of claim 1 wherein the nitro compound is nitrobenzene.

3. The method of claim 1 wherein the nitro compound is nitromethane.

4. The method of claim 1 wherein the nitro compound is nitroethane.

5. The method of claim 1 wherein the nitro compound is nitropropane.

6. The method of claim 1 wherein the nitro compound is nitrobutane.

7. The method of claim 1 wherein the nitro compound is nitropentane.

8. The method of claim 1 wherein the nitro compound is chloronitrobenzene.

* * * * *

PO-1050
(5/69)

UNITED STATES PATENT OFFICE
CERTIFICATE OF CORRECTION

Patent No. 3,859,353     Dated January 7, 1975

Inventor(s) Norman Bilow

It is certified that error appears in the above-identified patent and that said Letters Patent are hereby corrected as shown below:

In the Specification

Column 1, line 40, "20% of what it re-" should read "20% of what is re-".

line 42, the line should begin "dition, the resulting".

Column 2, line 5, the arrowhead is missing from the following expression:

$$\frac{\text{Nitro Compound}}{\text{Solvent}} \longrightarrow$$

line 9, "nitro ben-" should read "nitroben-".

line 23, "0.16 mole" should read "0.61 mole".

Signed and Sealed this sixth Day of January 1976

[SEAL]

Attest:

RUTH C. MASON
Attesting Officer

C. MARSHALL DANN
Commissioner of Patents and Trademarks